(12) United States Patent
El Falou et al.

(10) Patent No.: US 9,020,357 B2
(45) Date of Patent: Apr. 28, 2015

(54) COMPENSATION OF MODAL DISPERSION OF POLARIZATION BY DETERMINISTIC JAMMING OF POLARIZATION

(75) Inventors: Abdul Rahman El Falou, Kalamoun (LB); Paulette Gavignet, Trégastel (FR); Erwan Pincemin, Gommenec'h (FR)

(73) Assignee: Orange, Paris (FR)

( * ) Notice: Subject to any disclaimer, the term of this patent is extended or adjusted under 35 U.S.C. 154(b) by 111 days.

(21) Appl. No.: 13/879,133

(22) PCT Filed: Oct. 6, 2011

(86) PCT No.: PCT/FR2011/052340
§ 371 (c)(1),
(2), (4) Date: Apr. 12, 2013

(87) PCT Pub. No.: WO2012/049407
PCT Pub. Date: Apr. 19, 2012

(65) Prior Publication Data
US 2013/0195445 A1      Aug. 1, 2013

(30) Foreign Application Priority Data
Oct. 15, 2010  (FR) ..................................... 10 58447

(51) Int. Cl.
*H04B 10/2569*      (2013.01)
*H04B 10/532*      (2013.01)

(52) U.S. Cl.
CPC .......... *H04B 10/2569* (2013.01); *H04B 10/532* (2013.01)

(58) Field of Classification Search
CPC ......................... H04B 10/2569; H04B 10/532

USPC ......................................... 398/147, 152, 159
See application file for complete search history.

(56) References Cited

U.S. PATENT DOCUMENTS

| 5,008,958 A | 4/1991 | Cimini, Jr. et al. |
| 5,473,463 A * | 12/1995 | van Deventer ................ 398/205 |
| 2005/0162741 A1 * | 7/2005 | Sone et al. .................... 359/495 |

FOREIGN PATENT DOCUMENTS

| EP | 0 717 523 A2 | 6/1996 |
| JP | 2007-329558 A | 12/2007 |

OTHER PUBLICATIONS

Peterson Jr. et al., "Polarization mode dispersion compensator field trial and field fiber characterization," Optics Express, vol. 10(14), pp. 614-621 (Jul. 15, 2002).

(Continued)

*Primary Examiner* — Leslie Pascal
(74) *Attorney, Agent, or Firm* — Drinker Biddle & Reath LLP (57) ABSTRACT

A method of calculating a series of control parameters to be applied to a polarization controller arranged so as to compensate for the modal dispersion of polarization affecting an optical signal passing through an optical link by calculating a plurality of polarization states of which the respective representations on a Poincaré sphere are separated from one another by a distance greater than a minimum distance dependent on an acceptable threshold of bit error ratios and, for each state of polarization thus calculated, associating at least one control parameter to be applied to the polarization controller with the calculated state of polarization.

15 Claims, 8 Drawing Sheets

(56) References Cited

OTHER PUBLICATIONS

Sloane, "Table of Sphere Packings and Spherical Codes," IEEE Transactions on Information Theory, vol. IT-27(3), pp. 327-338 (May 1981).

Yaffe et al., "Experimental Determination of System Outage Probability Due to First and Second-Order PMD," Journal of Lightwave Technology, IEEE Service Center, New York, NY, US, vol. 24(11), pp. 4155-4161 (Nov. 2006).

* cited by examiner

COMPENSATION OF MODAL DISPERSION OF POLARIZATION BY DETERMINISTIC JAMMING OF POLARIZATION

CROSS-REFERENCE TO RELATED APPLICATIONS

This application is the U.S. national phase of the International Patent Application No. PCT/FR2011/052340 filed Oct. 6, 2011, which claims the benefit of French Application No. 1058447 filed Oct. 15, 2010, the entire content of which is incorporated herein by reference.

FIELD

The invention relates to the field of optical transmission systems, and more particularly to optical transmission systems subject to polarization mode dispersion.

BACKGROUND

An optical transmission system is typically composed of: a transmitting terminal transmitting at least one polarized optical carrier wave in which the power or the phase is modulated as a function of the information to be sent, a section of fiber, often single-mode, carrying the signal emitted by the transmitting terminal, and a receiving terminal which serves to receive the optical signal transmitted by the fiber.

The performance of an optical transmission system, particularly in terms of signal quality and data rate, is limited by the optical properties of the optical fiber which is a source of physical phenomena that degrade optical signals.

Attenuation of optical power and chromatic dispersion were first apparent as the most limiting of the phenomena identified, and means for at least partially resolving the degradations that they cause have been proposed.

Another unfavorable phenomenon is polarization mode dispersion (PMD) (also referred to herein as "modal dispersion of polarization"). Such a phenomenon is no longer insignificant, because of the ongoing attempts to further increase the transmission rate of optical signals.

This phenomenon of polarization mode dispersion is particularly difficult to compensate for when the optical transmission system that it affects is a WDM (Wavelength Division Multiplexing) optical transmission system used for long-haul terrestrial links and operating at bit rates per channel of 10 Gbit/s and above. Each channel is affected differently by polarization mode dispersion, requiring the use of single-channel compensation solutions.

With such data rates, the influence of polarization mode dispersion on fibers becomes problematic. A significant number of fibers in the networks of established carriers have PMD characteristics, so that transmission at 10 Gbit/s and beyond is not possible without changing all or part of the cable which represents a significant investment for the carriers concerned.

Certain optical devices for polarization compensation have been proposed for attempting to compensate for the impact of polarization mode dispersion but are still not in use at 10 Gbit/s, both because of their high cost and because these solutions are more suitable for single-channel systems (while WDM links contain several dozen channels) and have limited potential in terms of gain and response time. Most of these optical compensation devices require a feedback signal which necessitates a delay between detection and degradation and the application of the right parameters in the compensation device.

Other solutions for electronic compensation at 10 Gbit/s, based on FFE/DFE (Feed Forward Equalizer, Decision Feedback Equalizer) or MLSE (Maximum Likelihood Sequence Estimator) equalizers have also been developed and represent a possible alternative to cable replacement. These solutions, however, are still based on the concept of one compensator per channel, which represents a high cost if compensating for polarization dispersion in a WDM system.

SUMMARY

The invention aims to overcome the disadvantages mentioned above and has the object of providing a means of compensating for polarization mode dispersion PMD, applicable in particular in WDM systems and in this case enabling the use of only one or a limited number of device(s) for compensating at the same time for the PMD affecting all the channels of an optical link, in order to minimize the costs incurred.

Another object of the invention is to propose a solution for compensating for polarization mode dispersion which is independent of the data rate of the optical signal, independent of the modulation format employed in the optical signal, and which does not require a feedback signal.

For that purpose it proposes a method for calculating a series of control parameters to be applied to a polarization controller, arranged to compensate for the polarization mode dispersion affecting an optical signal traveling an optical link as a function of control parameters, said method comprising the calculation of a plurality of states of polarization for which the respective representations on a Poincaré sphere are separated from each other by a distance greater than a minimum distance dependent on an acceptable threshold for bit error ratios and, for each calculated state of polarization, the association of at least one control parameter, to be applied to the polarization controller, with this calculated state of polarization.

It is stressed here that the origin of the invention lies in a technical problem identified for a multichannel optical signal. However, the methods are also applicable to a single-channel optical signal.

In particular, the calculation method additionally comprises the determination of a number $n_{SOP}$ of distinct states of polarization to be calculated and the calculation of the plurality of states of polarization comprises the calculation of $n_{SOP}$ states of polarization having representations that are substantially equidistant on the Poincaré sphere, which obtains in a simple manner a plurality of states of polarization among which at most one state falls within a region of the Poincaré sphere associated with high bit error ratios.

Advantageously, the $n_{SOP}$ distinct states of polarization are calculated such that their respective representations are distributed over the entire Poincaré sphere, which further reduces the probability of falling several times within the same region of the Poincaré sphere associated with high bit error ratios.

In one particular embodiment, the determination of the number $n_{SOP}$ of states of polarization to be calculated includes calculating a maximum number $MAX(n_{SOP})$ of states of polarization as a function of the minimum distance, and selecting a number $n_{SOP}$ of states of polarization that is less than or equal to this maximum number $MAX(n_{SOP})$. This prevents two neighboring points from being located within the same region of the Poincaré sphere associated with high bit error ratios and thus limits the bit error ratio.

In an advantageous embodiment in which the optical signal carries at least one frame of data and in which an error correction code is used to encode the data carried by the optical signal, the step of determining the number $n_{SOP}$ of states of polarization to be calculated additionally comprises the calculation of a minimum number MIN($n_{SOP}$) of states of polarization to be calculated as a function of the number $n_{bits}$ of bits in this frame and the correction capacity $Cap_{cod}$ of the error correction code, the number $n_{SOP}$ additionally being selected to be greater than or equal to said minimum number MIN ($n_{SOP}$).

It is thus possible to guarantee that the correction limit of the error correction code is not exceeded, and therefore to guarantee a transmission having very low error levels after correction.

Advantageously, the error correction code is constructed from at least the concatenation of a first internal code, suitable for reducing the minimum distance, and a second error correction code adapted for correcting blocks of errors, which allows increasing the efficiency of the compensation for polarization mode dispersion according to the invention. The choice of a given correction code allows reducing the penalty region associated with high bit error ratios, thus reducing the minimum distance.

The invention also proposes a method of compensating for the polarization mode dispersion affecting an optical signal during its transmission in an optical link, said method comprising the successive application of a series of predetermined control parameters to a polarization controller located upstream from the optical link, these predetermined control parameters being calculated by means of the above calculation method.

In one embodiment in which the optical signal carries at least one frame of data, the predetermined control parameters are advantageously applied for an application duration determined according to the number $n_{bits}$ of bits in this frame and the number $n_{SOP}$ of states of polarization.

The invention additionally proposes a computer program comprising code instructions for implementing the steps of the above calculation method when it is loaded and executed in a calculation module, as well as a computer program comprising code instructions for implementing the steps of the above compensation method when it is loaded and executed in a dispersion compensation device. For the purposes of the protection desired, the above computer programs are to be considered as computer program products.

The invention also proposes a polarization mode dispersion compensation device comprising a polarization controller able to receive an optical signal and a control module arranged to apply at least one control parameter to the polarization controller, this compensation device being suitable for implementing the above compensation method.

In an advantageous embodiment of such a compensation device, the control module additionally comprises storage means in which is stored a plurality of control parameters to be applied to the polarization controller, this plurality of control parameters being obtained by means of the above calculation method.

Lastly, the invention proposes an optical transmission system comprising at least one optical link traveled by an optical signal and the above polarization mode dispersion compensation device, said compensation device being connected to the input to said optical link and being arranged to modify the state of polarization of the optical signal before it enters the optical link in order to compensate for the polarization mode dispersion affecting the optical signal as it travels this optical link.

Advantageously, such an optical transmission system additionally comprises at least one additional optical fiber of a length determined such that the level of residual chromatic dispersion at the output from the optical link exceeds a predetermined dispersion threshold, in order to have the states of polarization in the input to the optical link which are causing high bit error ratios fall within a single region on the Poincaré sphere, therefore facilitating the avoidance of such input polarizations.

In addition, such an optical transmission system advantageously comprises a plurality of optical transmitters connected to an optical multiplexer in order to provide a multichannel optical signal to the compensation device, the plurality of optical transmitters and the optical multiplexer being realized with polarization-maintaining components in order to better control the polarization that is input to the optical link.

BRIEF DESCRIPTION OF THE DRAWINGS

The methods for the calculation and compensation of polarization mode dispersion, as well as the compensation device and the optical transmission system using such a device, all of these being objects of the invention, will be better understood by reading the following description and consulting the attached drawings, in which.

DETAILED DESCRIPTION

To better understand the invention, certain principles concerning the polarization of an optical signal in a fiber will first be reviewed.

Manufacturing defects and mechanical constraints affecting the optical fibers of a transport network introduce a birefringence phenomenon in these optical fibers, which results in the creation of a fast axis and a slow axis of propagation, orthogonal to each other, which are commonly called the "proper axes" of the system.

If the optical signal is injected into the fiber along one of the proper axes, it is transmitted in a favorable state and it undergoes the minimum polarization mode dispersion, related only to the second order.

On the other hand, if the optical signal is injected randomly into the fiber, it may be separated into two components corresponding to the projections of the signal along the proper axes of the fiber, which will propagate at different speeds in the fiber.

Thus when the signal is received at the end of the optical link, the received pulse is deformed, causing a reduction in the transmission performance due to an increase in the bit error ratio (BER) in the transported bits.

It is easy to see that a signal injected at 45° to the proper axes represents the most unfavorable case where, by projection along the proper axes, half of the energy propagates at one speed while the other half moves at another speed, which results in the highest possible bit error ratios.

In such a case, the value of the difference accumulated between the two signal components at the end of the optical link corresponds to what is called the differential group delay (DGD) which corresponds to the first-order PMD effect.

In conclusion, to each state of polarization (SOP) that is input to the optical link there corresponds a certain bit error ratio which is a function of the position of this state of polarization relative to the proper axes.

It should also be noted that during the propagation within the fiber, the polarization of the signals evolves randomly, which makes it even more difficult to compensate for the polarization mode dispersion.

In order to visualize the evolution in the state of polarization in an optical fiber, it is particularly helpful to use a representation on the Poincaré sphere, where each state of polarization has a unique corresponding point on this sphere.

This Poincaré representation allows identifying specific regions on this sphere, representing the states of polarization input to the optical fiber that will introduce high bit error ratios.

Such regions are called "penalty regions". In the invention, it is necessary to attempt not to remain very long within such penalty regions, to avoid having high bit error ratios for too long of a period as this would give rise to a significant number of errors. These penalty regions express the evolution in the degree of polarization (DOP), which is an indicator of the influence of the PMD on the optical signal.

These penalty regions are not fixed over time, because they are related to the position of the proper axes of the optical transmission system, which varies over time due to factors such as the temperature and/or pressure on the optical fiber.

The position of these penalty regions therefore fluctuates over the life of the system, but in a relatively slow manner compared to the variation in the differential group delay or polarization mode dispersion at a given wavelength, as is described in the article "Polarization mode dispersion compensator field trial and field fiber characterization" by Daniel L. Peterson Jr. et al., 15 Jul. 2002, Vol. 10, No. 14, OPTICS EXPRESS 614.

In addition, such penalty regions depend on the wavelength, which explains why compensation, particularly in the case of a multichannel optical signal, is difficult to implement. FIGS. 1A to 1F illustrate the different forms that such penalty regions can take, depending on the type of dispersion considered.

Figure 1A:
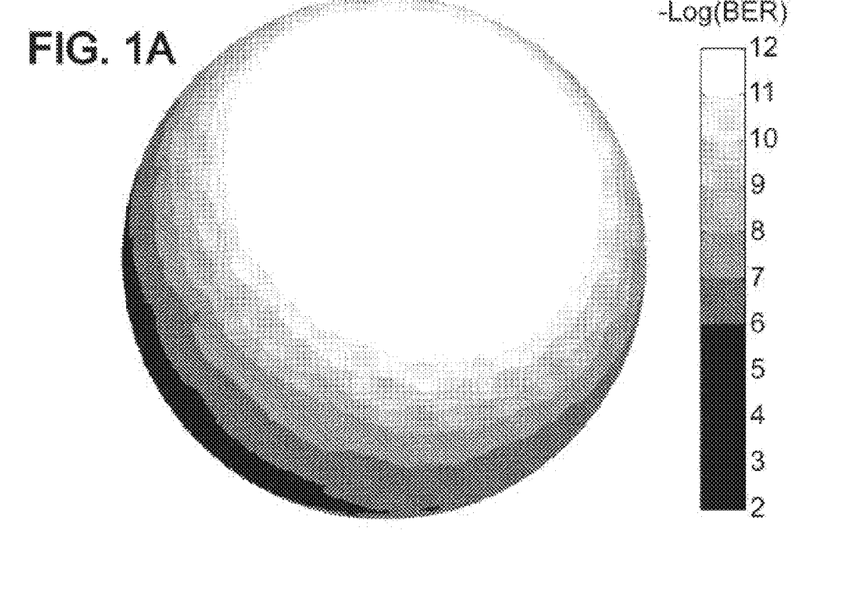
FIGS. 1A and 1B illustrate a Poincaré sphere representing the bit error ratio associated with an optical signal traveling an optical fiber subject to first-order polarization mode dispersion as a function of the state of polarization of the optical signal that is input to this optical fiber.
Figure 1B:
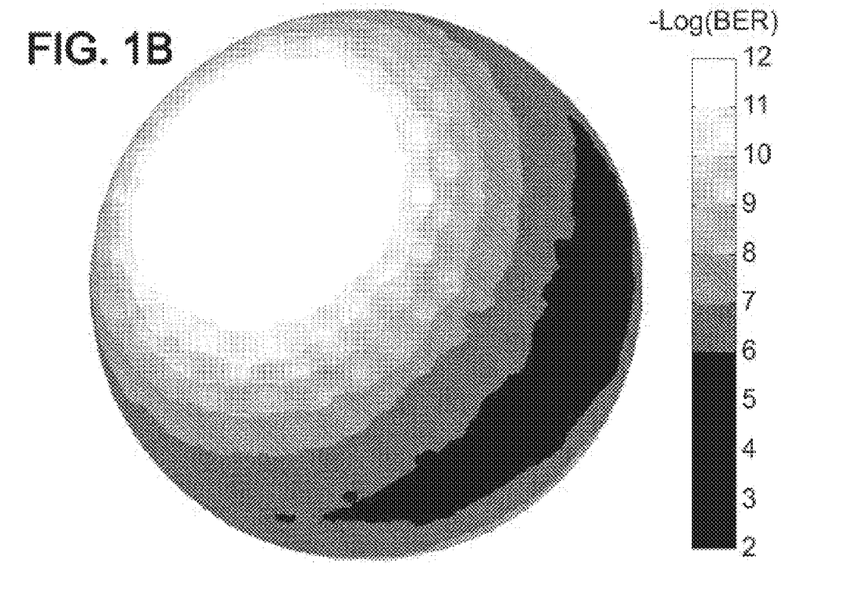

We will therefore first consider FIGS. 1A and 1B, which illustrate a Poincaré sphere representing the bit error ratio associated with an optical signal traveling an optical fiber subject only to first-order polarization mode dispersion as a function of the state of polarization of the optical signal that is input to this optical fiber.

As this Poincaré sphere is traditionally three-dimensional, FIGS. 1A and 1B illustrate the respective projections of the two opposing hemispheres which constitute the Poincaré sphere, for practical illustrative purposes.

These figures are obtained from simulation results, confirmed by experimental results, showing the bit error ratios expressed in the form of their $-\log_{10}(\text{BER})$, calculated for 130 points for states of polarization which are equidistant on the Poincaré sphere, in the presence of a differential group delay of 60 ps. The regions in dark grey represent the high bit error ratios.

It is therefore evident in these FIGS. 1A and 1B that the penalty region, represented in dark gray, where the bit error ratio exceeds a certain threshold (for example on the order of $10^{-5}$) forms a ring. One can also distinguish the proper axes which are represented by the two light gray regions corresponding to the best bit error ratios, meaning the bit error ratios below a certain value (for example on the order of $10^{-10}$).

Figure 1C:
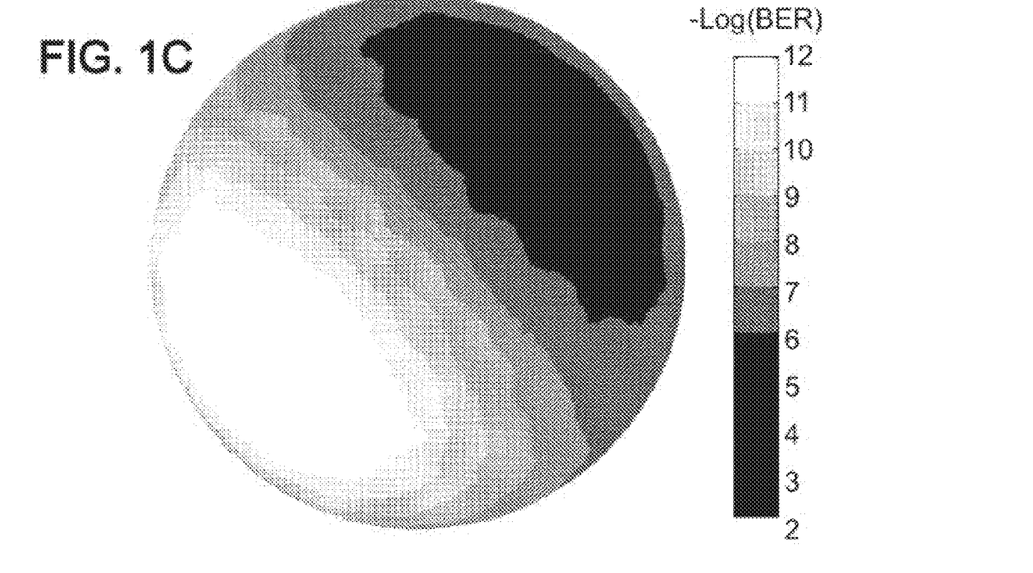
FIGS. 1C and 1D illustrate a Poincaré sphere representing the bit error ratio associated with an optical signal traveling an optical fiber subject to first- and second-order polarization mode dispersions as a function of the state of polarization of the optical signal that is input to this optical fiber.
Figure 1D:
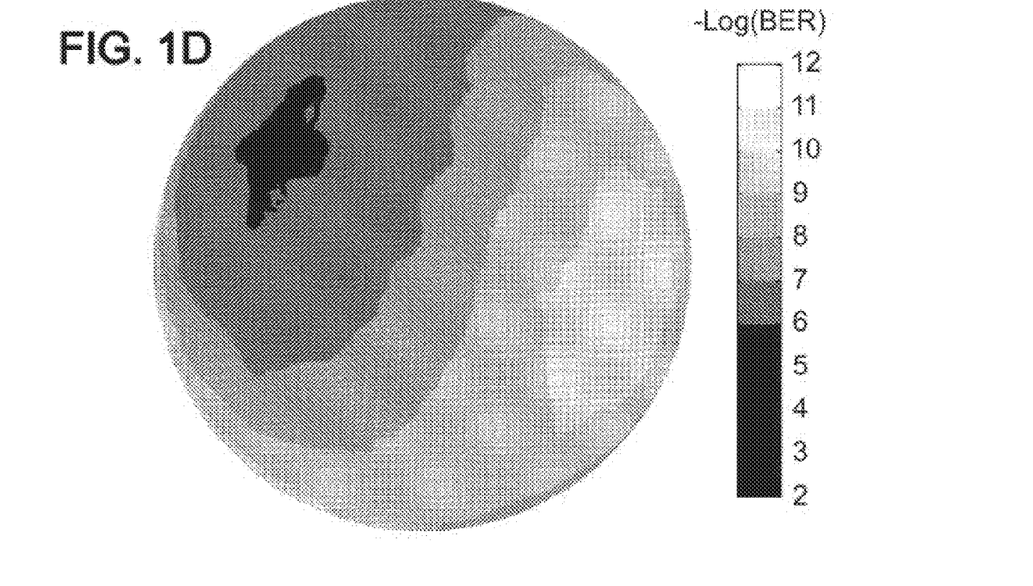

FIGS. 1C and 1D illustrate a Poincaré sphere which also takes into account second-order polarization mode dispersion (SOPMD) which is added to the differential group delay.

In these FIGS. 1C and 1D, also obtained by simulations confirmed by experimental results under the same conditions as in FIGS. 1A and 1B, one can see that the penalty regions indicated in dark gray have been reshaped.

More specifically, there are no longer any of the ring-shaped penalty regions of FIGS. 1A and 1B, but there are penalty regions (still for bit error ratios exceeding a threshold on the order of $10^{-5}$) having a new shape corresponding to two diametrically opposite spots.

Figure 1E:
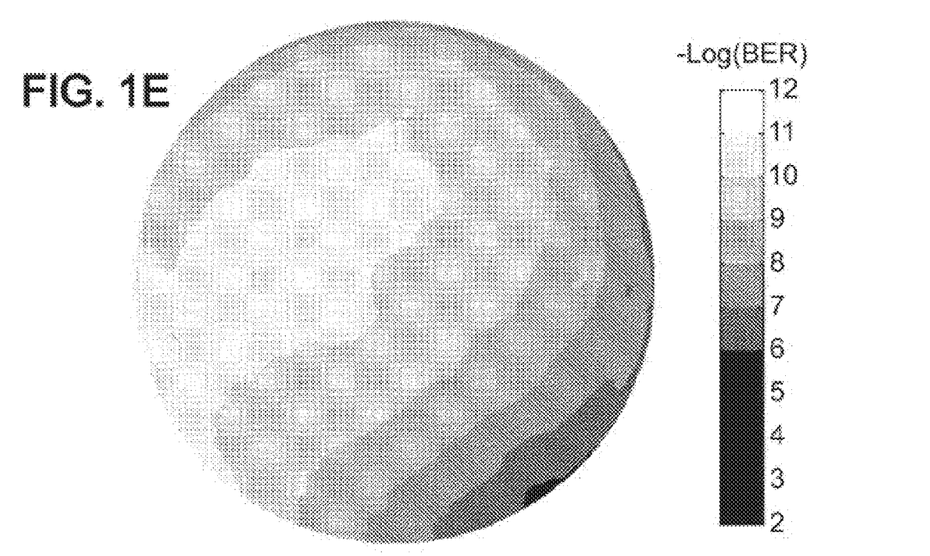
FIGS. 1E and 1F illustrate a Poincaré sphere representing the bit error ratio associated with an optical signal traveling an optical fiber subject to first- and second-order polarization mode dispersions, as well as to a non-zero residual chromatic dispersion, as a function of the state of polarization of the optical signal that is input to this optical fiber.
Figure 1F:
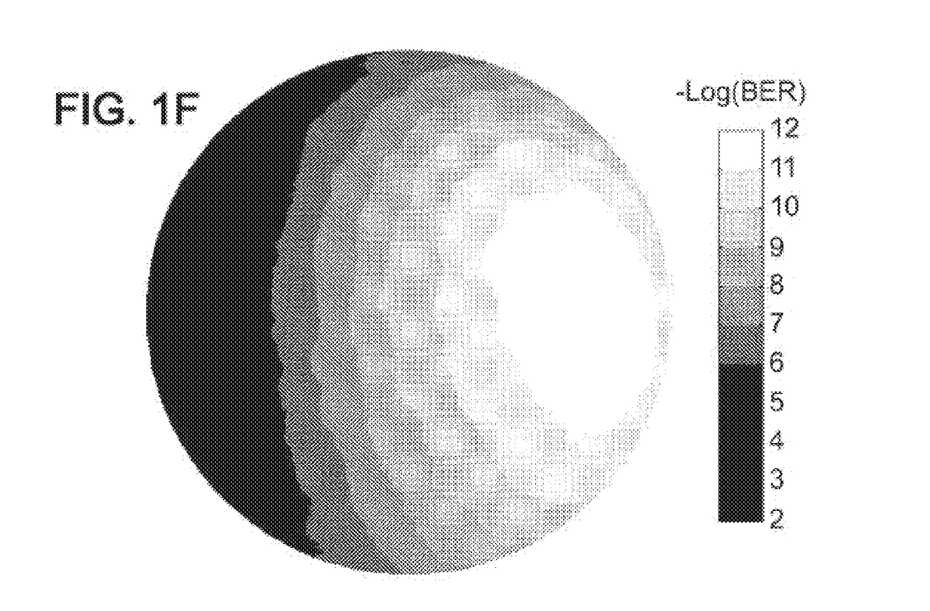

Lastly, FIGS. 1E and 1F illustrate a Poincaré sphere in which not only are the first-order (DGD) and second-order (SOPMD) mode dispersions taken into account, but also the chromatic dispersion.

In this third example, the results of the simulations illustrated in FIGS. 1E and 1F, conducted under the same conditions as in FIGS. 1A and 1B, reveal a change in the shape of the penalty regions represented in dark gray, which are now reduced to a single spot on the Poincaré sphere, still for bit error ratios exceeding a threshold on the order of $10^{-5}$.

Under these conditions, the compensation solution of the invention consists of installing, at the input end of the optic connection, a polarization mode dispersion compensation device arranged to scramble the polarization of optical signals transmitted in the optical link ("polarization scrambling", also referred to herein as "jamming"), changing the polarization of such optical signals at the input end of the optical link in a deterministic manner and preferably sufficiently quickly to avoid landing as much as possible within a penalty region on the Poincaré sphere as described above, and therefore minimizing as much as possible the probability of transmission errors. Such a device is for example a Lithium Niobate modulator (LiNbO3).

Figure 2:
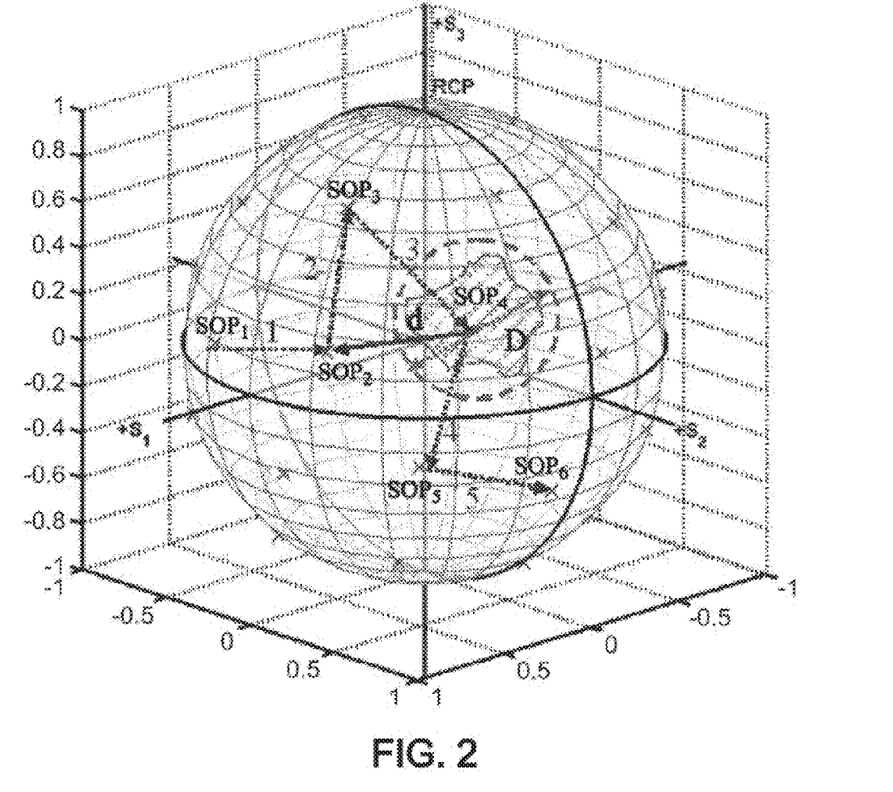
FIG. 2 illustrates a Poincaré sphere on which the principle of the invention is represented.

The principle of the invention is illustrated in more detail in FIG. 2, which represents a Poincaré sphere having a single penalty region to be avoided as much as possible in order to decrease the probability of errors.

In this FIG. 2, the penalty region is formed of a single spot, in the manner illustrated in FIGS. 1E and 1F in which first- and second-order polarization mode dispersions are taken into account as well as a non-zero chromatic dispersion.

The boundary of this penalty region is defined as being the set of states of polarization that are input to the optical link, represented on the Poincaré sphere, causing a bit error ratio corresponding to an acceptable threshold for bit error ratios.

All points of the Poincaré sphere outside this boundary correspond to states of polarization causing bit error ratios below this acceptable threshold for bit error ratios, and conversely all the points of the Poincaré sphere located within the penalty region delimited by this boundary correspond to states of polarization causing bit error ratios above this acceptable threshold for bit error ratios, and therefore to be avoided as much as possible.

The boundary of the penalty region, and therefore the size of the penalty region, depends on the level of polarization mode dispersion affecting the optical fiber considered. The higher the level of polarization mode dispersion affecting the optical fiber, the larger the penalty region to be avoided, and vice versa.

Purely as an illustration, an acceptable threshold for bit error ratios can be $10^{-6}$ or $10^{-7}$ for example. This acceptable threshold for bit error ratios can be defined, for example, as a function of the number of errors considered to be acceptable by the carrier providing the transmission system.

In particular, to the extent that an error correction code is used to encode the data transmitted on the multichannel optical signal, this acceptable threshold for error ratios can be defined as being the bit error ratio corresponding to the correction limit of the error correction code used, meaning the maximum error ratio value that is admissible as input to a decoder in order to guarantee bit error ratios below a certain limit in the output from this decoder (for example $10^{-15}$, which is less than one error per day).

Thus, the more powerful the error correction code, the higher the value of the acceptable threshold for bit error ratios, and the smaller the penalty region on the Poincaré sphere.

Purely as an illustration, when a Reed-Solomon error correction code of type RS(255,239) is used, the acceptable threshold value for bit error ratios is on the order of $10^{-4}$ for the input in order to guarantee a bit error ratio for the output of less than $10^{-14}$.

In order to limit the possibility of falling within such a penalty region as much as possible, the idea of the invention consists of regularly modifying the state of polarization that are input to the optical link by obtaining states of polarization for which the representations on the Poincaré sphere are separated by a distance d greater than a minimum distance D, which prevents landing multiple times within this penalty region.

This distance D can be defined as the maximum distance between two distinct points among the set of points of the Poincaré sphere that lie within the penalty region corresponding to a given acceptable threshold for bit error ratios. This minimum distance D thus depends on the given acceptable threshold for bit error ratios.

To better visualize this minimum distance D in FIG. 2, one can define a penalty circle corresponding substantially to the minimum circle circumscribing the entire penalty region to be avoided. This minimum circle can be calculated as being the circle passing through the two points furthest apart from each other within the penalty region corresponding to a certain acceptable threshold for bit error ratios.

The diameter of this penalty circle then corresponds to the minimum distance D to be respected between two successive states of polarization on the Poincaré sphere, in order to avoid landing more than once within the penalty region.

This is illustrated in FIG. 2, where the change from one successive state of polarization to another is indicated by the arrows. One can see in this example that, to the extent that the distance d between the different successive states of polarization is greater than the diameter D of the penalty circle circumscribing the penalty region to be avoided, although it is possible to fall once within the penalty region (after the third modification to the state of polarization in the example in FIG. 2), in principle such a situation does not occur more than once because all states of polarization other than the one located within the penalty region are at a distance from the latter that is greater than the diameter D and are therefore located outside the penalty circle.

This prevents remaining for too long within the penalty region, which would result in too high a number of errors.

A particularly advantageous embodiment, because it is easy to implement, obtains states of polarization meeting the above criterion by choosing a certain number of points distributed in an equidistant manner on the Poincaré sphere, such that the distance d between these points is greater than the minimum distance D represented on the Poincaré sphere as the diameter of the penalty circle. This is the case illustrated in FIG. 2, where six points are represented.

It should be noted here, however, that to the extent that the penalty region is not necessarily a fixed position on the Poincaré sphere, there may be situations where even when applying the above method, several states of polarization are obtained that fall within a moving penalty region.

To avoid such situations as much as possible, a sufficiently fast scrambling speed can be chosen so that the penalty region can be considered as fixed during the time required to travel the entire Poincaré sphere (at least once).

Once the states of polarization meeting the above criterion are determined, the control parameters to be applied to a polarization controller in order to obtain such states of polarization can be deduced and stored, before being applied sequentially to the polarization controller so as to actually obtain the desired compensation.

Figure 3:
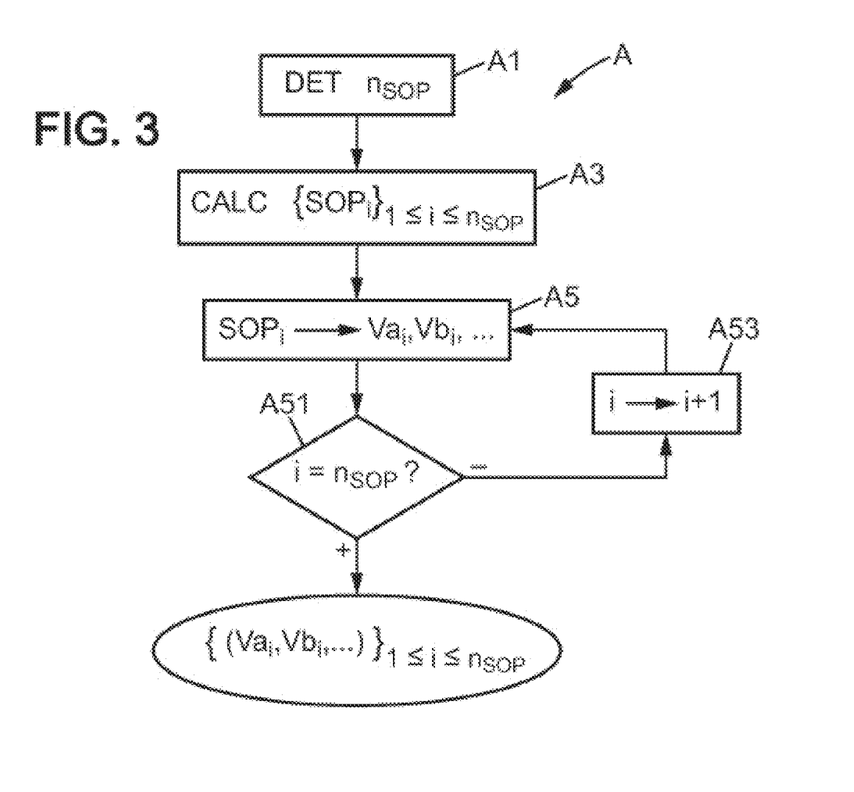
FIG. 3 illustrates the steps of a method for calculating a series of control parameters to be applied to a polarization scrambler according to a particular embodiment of the invention.

We will now refer to FIG. 3, which details the steps of a method for calculating a series of control parameters to be applied to a polarization controller in order to compensate for the polarization mode dispersion affecting an optical signal traveling an optical link.

This calculation method comprises a first step (step A3) of calculating a plurality of states of polarization $SOP_i$ having respective representations on a Poincaré sphere that are separated by a distance d greater than a minimum distance D dependent on an acceptable threshold for bit error ratios.

At the end of this first calculation step, a certain number $n_{SOP}$ of distinct states of polarization $SOP_i$ are obtained, these $n_{SOP}$ states of polarization $SOP_i$ satisfying a criterion which allows minimizing the probability of continuously remaining within a region representing high bit error ratios in the output from the optical fiber, and therefore minimizing the probability of errors induced by transmission in the optical link.

After this first calculation step A3, a series of association steps A5 is conducted for each of the states of polarization $SOP_i$ calculated during step A3 (which is symbolized by the loop A51 and A53), in order to associate each calculated state of polarization $SOP_i$ with one or more control parameter(s) to be applied to the polarization controller.

Each of these association steps A5 includes calculating, for each state of polarization $SOP_i$ calculated during step A3, at least one set of control parameter(s) to be applied to the polarization controller, as a function of the state of polarization at its input, in order to obtain the calculated state of polarization $SOP_i$ at the output from the polarization controller. Depending on the type of polarization controller used, a single control parameter $Va_i$ may be calculated, or possibly multiple parameters $Va_i$, $Vb_i$, etc.

Thus, at the end of the series of association steps A5 conducted for each of the $n_{SOP}$ distinct states of polarization $SOP_i$, a set of control parameters $\{(Va_i, Vb_i, \ldots)\}_{1 \leq i \leq nSOP}$ is obtained that assembles, for each distinct state of polarization $SOP_i$, one or more control parameters to be applied successively to the polarization controller in order to obtain at the output from the polarization controller the different states of polarization $SOP_i$ calculated during step A3.

In one particular embodiment, the calculation method A comprises a prior step A1 of determining the number $n_{SOP}$ of states of polarization to be calculated as a function of the minimum distance D.

In this embodiment, the first step A3 of calculating a plurality of states of polarization then advantageously comprises the calculation of $n_{SOP}$ distinct states of polarization having substantially equidistant representations on the Poincaré sphere, meaning the respective representations of the calculated $n_{SOP}$ states of polarization form a grid on the Poincaré sphere in which the neighboring points in this grid are substantially separated by a distance d, as represented in FIG. 2.

It may be particularly advantageous here to calculate the $n_{SOP}$ distinct states of polarization such that their respective representations are distributed over the entire Poincaré sphere. On the one hand, such a calculation can be done based on solely the number $n_{SOP}$. On the other hand, maximizing the distribution of the states of polarization on the Poincaré sphere allows reducing the probability of choosing a state of polarization that accidentally falls within a penalty region.

To do this, one can use tables of spherical codes such as the ones described in the article "Tables of Spherical Codes" by N. J. A. Sloane et al. Such tables give the position of a number of equidistant points (meaning that neighboring points are separated from each other by the same distance) distributed over an entire sphere as a function of this single number of points.

These tables can therefore be used to define $n_{SOP}$ equidistant points distributed over the entire Poincaré sphere, and the $n_{SOP}$ states of polarization $SOP_i$ which are respectively represented by these points are deduced from this.

Figure 4:
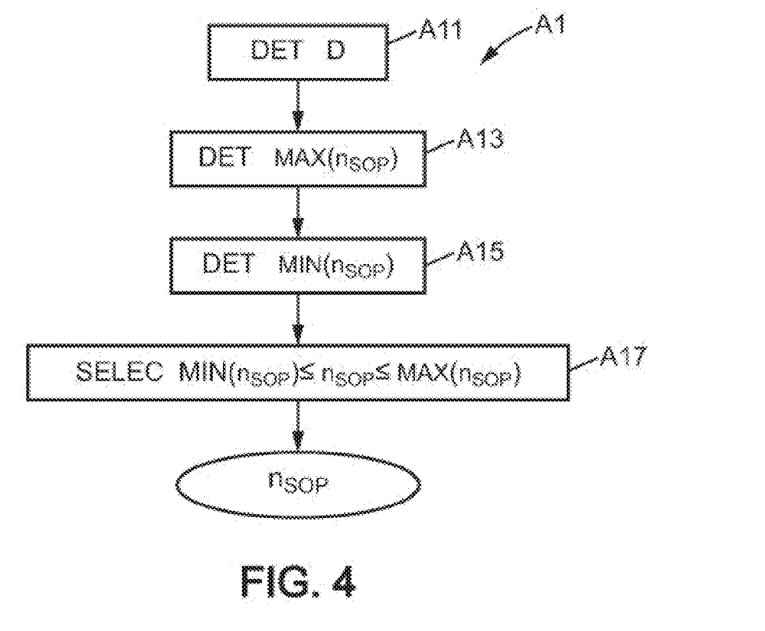
FIG. 4 illustrates the component sub-steps of the step of determining the number of states of polarization to be calculated in an embodiment of the invention.

FIG. 4 illustrates the component sub-steps of the above step of determining the number $n_{SOP}$ of states of polarization to be calculated, according to a particular embodiment, when wanting to obtain $n_{SOP}$ states of polarization $SOP_i$ having respective representations that are substantially equidistant on the Poincaré sphere.

The determination step A1 advantageously includes a prior step of determining (step A11) the minimum distance D corresponding to the acceptable threshold for bit error ratios that is not to be exceeded.

Such a minimum distance D can be determined in advance, by measuring this distance on a Poincaré sphere obtained for a given polarization mode dispersion by simulation or with experimental tests. The minimum distance D then applies to any optical fiber having a polarization mode dispersion less than or equal to this given polarization mode dispersion, to the extent that the other elements of the link are identical, particularly the error correction code used.

It is possible to determine the largest dimension of the penalty region on the Poincaré sphere. The minimum distance D can then correspond to this largest dimension, or even to a slightly higher value in order to allow a margin.

Once this minimum distance D is known, it is possible to calculate (calculation step A13) a maximum number MAX ($n_{SOP}$) of states of polarization beyond which there is a risk of falling multiple times within the same penalty region.

In effect, the greater the number $n_{SOP}$, the larger the number of points on the Poincaré sphere and the smaller the distance d separating two neighboring states of polarization in the grid distributed over the entire Poincaré sphere.

To the extent that this distance d is chosen to be greater than the minimum distance D, it is advisable to choose a number $n_{SOP}$ of states that is less than or equal to a maximum number MAX($n_{SOP}$) corresponding to a number of points in a grid that are equidistant and distributed over an entire sphere, beyond which the distance d between two neighboring points in this grid is less than the minimum distance D.

Once this maximum number MAX($n_{SOP}$) is calculated, the selection (A17) of a number $n_{SOP}$ less than or equal to this maximum number MAX($n_{SOP}$) can be made, which allows calculating a number of states of polarization $SOP_i$ that avoids landing multiple times within the same penalty region.

With the embodiment described above, it is thus possible to calculate control parameter values which limit the probability of having states of polarization in the input to the optical link which result in bit error ratios that are too high. However, in most applications, an error correction code is used to encode the data transmitted in the optical signal in order to attempt to achieve a nearly error-free transmission, meaning a transmission having a bit error ratio on the order of $10^{-15}$.

In such an embodiment where an error correction code is employed, it is advantageous not to remain too long in a same state of polarization, to avoid substantially increasing the probability of creating bit error ratios exceeding the correction capacity of the error correction code, which would prevent achieving the goal of a nearly error-free transmission.

In order to satisfy this second constraint, step A1 of determining the number $n_{SOP}$ advantageously contains an additional step A15 of calculating a minimum number MIN($n_{SOP}$) of points on the Poincaré sphere below which there is a risk of obtaining a state of polarization causing a bit error ratio exceeding the correction capacity of the error correction code.

In particular, when the optical signal carries one or more frames of data each containing a number $n_{bits}$ of bits, the calculation of the minimum number MIN($n_{SOP}$) of states of polarization to be calculated is done as a function of the number $n_{bits}$ of bits in a frame and the correction capacity $Cap_{cod}$ of the error correction code.

This minimum number MIN($n_{SOP}$) can thus advantageously be calculated by means of the following equation:

$\text{MIN}(n_{SOP}) = E(n_{bits}/\text{Cap}_{cod})$ where $E(x)$ indicates the integer part of $x$.

In such a case, the number $n_{SOP}$ is then additionally selected, during the selection step A17, to be greater than or equal to said minimum number MIN($n_{SOP}$).

In other words, the number $n_{SOP}$ of states to be calculated can be chosen such that:

$\text{MIN}(n_{SOP}) \leq n_{SOP} \leq \text{MAX}(n_{SOP})$

As an example, in order to better illustrate this last aspect of the invention, one can consider the case where a standard Reed-Solomon error correction code of the type RS(255,239) is used to encode the data carried by the multichannel optical signal.

A typical data signal is then composed of a frame constructed by interlacing 16 sub-frames of 255 bytes, the total number of bits in the frame then being $n_{bits}=255*8*16=32640$ bits and the duration $\tau_{bit}$ of each bit being for example 93.4 ps for a bit symbol rate equal to 10.7 Gbit/s.

With such a standard Reed-Solomon code RS(255,239), the correction capacity per sub-frame is 8 bytes, which gives us a correction capacity $Cap_{cod}$, for correcting a number of consecutive erroneous bits, of $Cap_{cod}=8*8*16-7=1017$ bits. With these parameters, the minimum number $MIN(n_{SOP})$ is equal to $E(32640/1017)=32$, and it is then appropriate to choose a number $n_{SOP}$ greater than or equal to 32 distinct states of polarization on the Poincaré sphere.

It is then possible at this stage to verify whether such a grid of 32 points that are substantially equidistant and uniformly distributed over the entire sphere, calculated for example using one of the possible spherical tables for 32 points as defined in the article "Tables of Spherical Codes" by N. J. A. Sloane et al. cited above, also satisfies the other condition in which the distance d between two neighboring points is greater than a minimum distance D corresponding to a given acceptable threshold for bit error ratios.

If such is the case, said grid of 32 substantially equidistant points distributed over the Poincaré sphere can be used to find the control parameter values to be applied to a polarization controller, in order to have the optical signal successively present each of the states of polarization $SOP_i$ represented by the points of this network at the output from a polarization controller placed at the input end of the optical link.

In one particular embodiment, the association which then allows finding the control parameter values to be applied, based on the desired states of polarization $SOP_i$, can be conducted using a Jones matrix characterizing the polarization controller employed.

Figure 5:
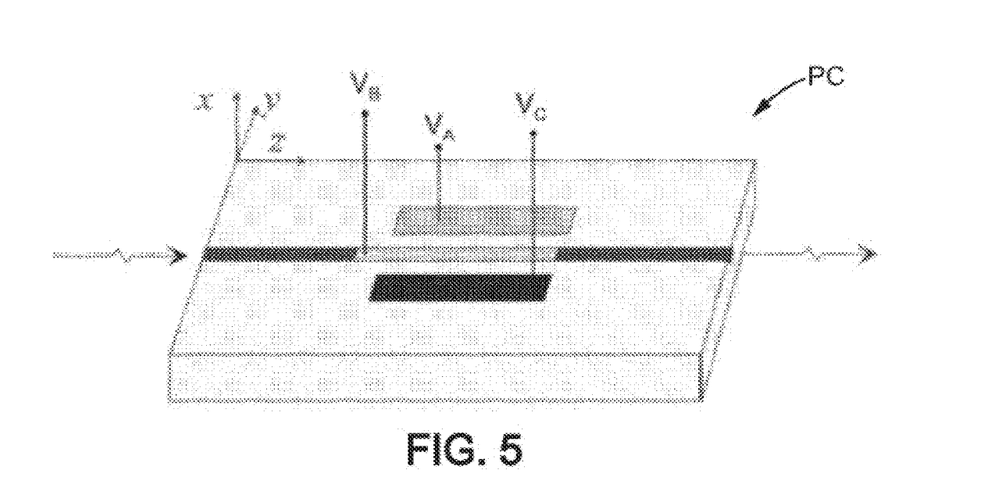
FIG. 5 schematically illustrates a polarization controller which can be used in the context of a particular embodiment of the invention.

In this particular embodiment, the control parameter then corresponds to a control voltage and the association is made by calculations, using the Jones matrix associated with the polarization controller employed, as is now explained in relation to FIG. 5.

In order to better illustrate such an association of control voltage values to be applied and states of polarization, we will now refer to FIG. 5, which illustrates an example of a polarization controller usable in a compensation device according to the invention.

In particular, a polarization controller which enables the deterministic scrambling described above can be realized of Lithium Niobate LiNbO3.

This polarization controller consists of a certain number of stages representing a phase retardation $\delta$ plate and an angle of orientation $\alpha/2$. The values of $\delta$ and $\alpha/2$ are adjustable and controlled by the voltages $V_A$, $V_B$ and $V_C$ applied to the polarization controller.

The relations between the parameters $\alpha$ and $\delta$ and the applied voltages may satisfy the following typical equations:

$$V_A = 2V_0 \cdot \delta \cdot \sin(\alpha) - V_\pi \cdot \delta \cdot \cos(\alpha) + V_{A,Bias} \quad (1)$$

$$V_B = 0 \text{ (Mass)} \quad (2)$$

$$V_C = 2V_0 \cdot \delta \cdot \sin(\alpha) + V_\pi \cdot \delta \cdot \cos(\alpha) + V_{C,Bias} \quad (3)$$

where:
- $V_\pi$ is the voltage required to introduce a phase difference of 180° between the TE mode and the TM mode, the TE mode being the transverse electric mode and the TM mode being the transverse magnetic mode perpendicular to TE as defined in the theory of electromagnetic waves;
- $V_0$ is the voltage required to convert the TE mode into the TM mode, and the reverse;
- $V_{A,Bias}$ and $V_{C,Bias}$ are the voltages required to cancel out the birefringence between the TE and TM modes;
- $\delta$ is the value of the phase difference induced by the polarization controller. To generate a quarter-wave plate, $\delta = \frac{1}{4}$ is required.
- $\alpha/2$ is the angle of orientation of our plate.

If one defines $V_A' = V_A - V_{A,Bias}$ and $V_C' = V_C - V_{C,Bias}$, it is possible to deduce the two following equations from equations (1) and (3):

$$\alpha = \arctg\left(\frac{V_\pi}{2V_0} \cdot \frac{V_C' + V_A'}{V_C' - V_A'}\right) \quad (4)$$

$$\delta = \sqrt{\frac{(V_C' + V_A')^2}{16 \cdot V_0^2} + \frac{(V_C' - V_A')^2}{4 \cdot V_\pi^2}} \quad (5)$$

Equations (4) and (5) allow calculating the phase shift and the orientation of the plate as a function of the voltages applied to the polarization controller, therefore the transfer function of this polarization controller.

The vector nature of the state of polarization (SOP) makes it appropriate to use a matrix representation of this state of polarization. The Jones formalism allows describing the state of polarization of light, and its evolution through an optical system, using the Jones matrix.

The Jones vector for a polarized wave propagating along an axis is defined by a column vector such that:

$$\begin{pmatrix} Ex(t) \\ Ey(t) \end{pmatrix} = \begin{pmatrix} E_{0x} e^{j\omega t} \\ E_{0y} e^{(j\omega t - \varphi)} \end{pmatrix}$$

where Ex(t) and Ey(t) are the components of the electrical field of the wave along axes x and y.

The propagation of a wave in a birefringent medium affects its state of polarization. This variation depends on the transmission medium (phase converter, polarizer, guide ... ). Using the Jones representation, one can therefore write:

$$\begin{pmatrix} E_x^{(out)} \\ E_y^{(out)} \end{pmatrix} = \begin{bmatrix} J_{11} & J_{12} \\ J_{21} & J_{22} \end{bmatrix} \begin{pmatrix} E_x^{(in)} \\ E_y^{(in)} \end{pmatrix}$$

where the coefficients $J_{xx}$ are the complex coefficients of the Jones matrix of the birefringent medium.

Thus, for the polarization controller of FIG. 4, the Jones matrix for a stage is expressed by the following equation:

$$J(\delta, \alpha/2) = \begin{pmatrix} \cos(\delta/2) + i \cdot \cos(\alpha) \cdot \sin(\delta/2) & i \cdot \sin(\alpha) \cdot \cos(\delta/2) \\ i \cdot \sin(\delta) \cdot \sin(\delta/2) & \cos(\delta/2) - i \cdot \cos(\alpha) \cdot \sin(\delta/2) \end{pmatrix}$$

Based on equations (4), (5) and (6), one can therefore calculate the Jones matrix for the polarization controller of FIG. 5 as a function of the applied voltages Va and Vc.

Once this Jones matrix is calculated, it is then possible, knowing the state of polarization at the input to the polarization controller, to calculate the voltage values to be applied in order to obtain a desired determined state of polarization at the output from the polarization controller.

In an advantageous embodiment where the fibers concerned in maintaining polarization are used upstream of the polarization controller, it is possible to know the state of polarization at the input to the polarization controller. One can then use this to deduce the control voltage values corresponding to each state of polarization SOP desired at the output from the polarization controller. To compensate for polarization mode dispersion, it is then sufficient to apply these control voltage values for a period defined by the time each state of polarization must be maintained.

Using the example where 32 points on the Poincaré sphere must be determined, meaning 32 distinct states of polarization $SOP_i$, and a single stage of the polarization controller is used, one must then determine 32 voltage values for Va and 32 other values for Vc, such that there are two values $Va_1$ and $Vc_1$ for $SOP_1$, two values $Va_2$ and $Vc_2$ for $SOP_2$, etc.

In other words, the following table of values is determined, which can be stored in a control module of the polarization controller in order to apply the control voltage values sequentially:

TABLE 1

| State of polarization | Control voltage value Va | Control voltage value Vc |
|---|---|---|
| $SOP_1$ | $Va_1$ | $Vc_1$ |
| ... | ... | ... |
| $SOP_{32}$ | $Va_{32}$ | $Vc_{32}$ |

The control voltage values $Va_1$ and $Vc_1$ are thus applied for a certain period, then the values $Va_2$ and $Vc_2$, and so on in a periodic manner, meaning once again starting with the control voltage values $Va_1$ and $Vc_1$ after applying the values $Va_{32}$ and $Vc_{32}$.

Figure 6:
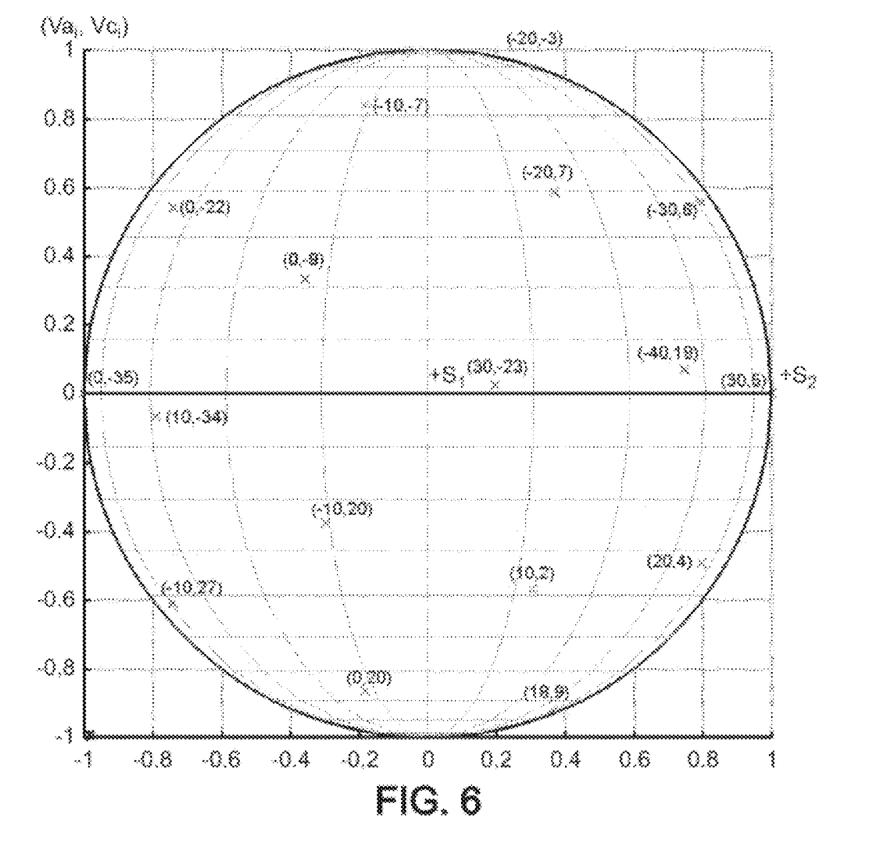
FIG. 6 illustrates half of a Poincaré sphere on which are represented 16 states of polarization $SOP_i$ and the associated control voltage values $Va_i$ and $Vc_i$ obtained by means of the calculation method according to a particular embodiment of the invention.

FIG. 6 shows examples of control voltage values $Va_i$ and $Vc_i$ which can be applied to a polarization controller as represented in FIG. 5, for a number $n_{SOP}$ equal to 32, in order to obtain 32 states of polarization $SOP_i$, their respective representations being arranged in an equidistant manner and distributed over the entire Poincaré sphere.

In this FIG. 6 where 16 states of polarization $SOP_i$ are specifically represented, each of the 16 points corresponding to one of these states of polarization $SOP_i$ has two corresponding voltage values $Va_i$ and $Vc_i$.

Here, it is advantageous if two successive states $SOP_i$ and $SOP_{i+1}$ in the series of states of polarization to be obtained are neighbors in the grid on the Poincaré sphere, in order to have limited variations in the voltage values and thus avoid traveling through the penalty region when changing from one state of polarization to another.

It should be emphasized that FIG. 5 represents a polarization controller managed using control voltages. Other embodiments based on other types of polarization controller are also possible. One non-limiting example is a polarization controller composed of acousto-optic material, controlled using an RF sinusoidal control signal within a given frequency range. It is then sufficient to associate, with a state of polarization, a control parameter value which allows obtaining this state of polarization at the output from this polarization controller.

Figure 7:
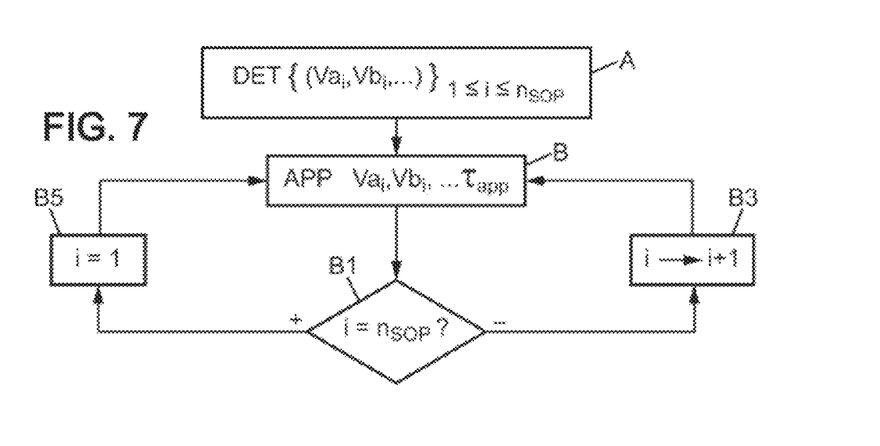
FIG. 7 illustrates the steps of a polarization mode dispersion compensation method according to a particular embodiment of the invention.

We will now refer to FIG. 7, which illustrates a method for compensating for polarization mode dispersion affecting an optical signal, for example multichannel, during its transmission in an optical link according to the invention.

The compensation method uses a series of control parameters calculated by means of the calculation method described above.

This compensation method comprises a first phase A of calculating a series of values $Va_i$, $Vb_i$, etc. of control parameters to be applied to a polarization controller in order to obtain as output from this controller a series of states of polarization which allow compensating for the polarization mode dispersion affecting the multichannel optical signal during its travel through an optical link, this series of control parameter values being calculated using the calculation method presented above.

Once this series of values $Va_1$, $Vb_i$, etc. is calculated, the compensation method comprises the successive application (B) of respective control parameter values to a polarization controller located upstream from the optical link to be compensated.

Thus, when $n_{SOP}$ predetermined states of polarization are to be obtained at the output from the polarization controller and this controller is controlled by means of two distinct control parameter values $Va_i$ and $Vb_i$, the method comprises $n_{SOP}$ successive steps of applying a series of control parameters $(Va1, Vb_1), \ldots, (Va_{nSOP}, Vb_{nSOP})$, which is symbolized in FIG. 7 by a loop comprising, for a given variable i, a verification of whether a number $n_{SOP}$ of successive application steps has been reached (step B1), followed by returning to the next application step for this incremented variable i (step B3) if such is not the case.

When the $n_{SOP}$ successive application steps in which predetermined control parameters are applied have been completed, it is possible to restart the successive application phase B by starting over with the first control parameters $Va_i$, $Vb_i, \ldots$, which is symbolized in FIG. 7 by the loop B5 returning to the first of the application steps B.

The $n_{SOP}$ states of polarization calculated during phase A are thus obtained within a loop in order to maintain the compensation process for a sufficiently long period of time.

As the optical signal carries one or more frames of data, it is particularly advantageous, in each step B of applying control parameters $Va_i, Vb_i, \ldots$, to apply these parameters for an application duration $\tau_{app}$ determined such that all the calculated states of polarization $SOP_i$ are obtained successively and only once during the duration of one frame of data.

In effect, if the application duration decreases too sharply, the same problematic state of polarization $SOP_i$ may be obtained two (or more) times during the same frame, which can lead to bit error ratios that are impossible to compensate for with the error correction code.

To do this, the application duration $\tau_{app}$ for the control parameters is advantageously determined as a function of the number of bits $n_{bits}$ of a frame and the number $n_{SOP}$ of calculated states of polarization.

In particular, this duration can be calculated using the following equation:

$$\tau_{app} = (n_{bits}/n_{SOP}) * \tau_{bit}$$

where $\tau_{bit}$ corresponds to the duration of a bit in the frame.

By taking the example described above, the application duration $\tau_{app}$ is thus 95 ns (95 ns=(32640/32)*93.4 ps for a bit rate of 10.7 Gbit/s) in each of the states of polarization $SOP_i$ to be obtained.

Figure 8:
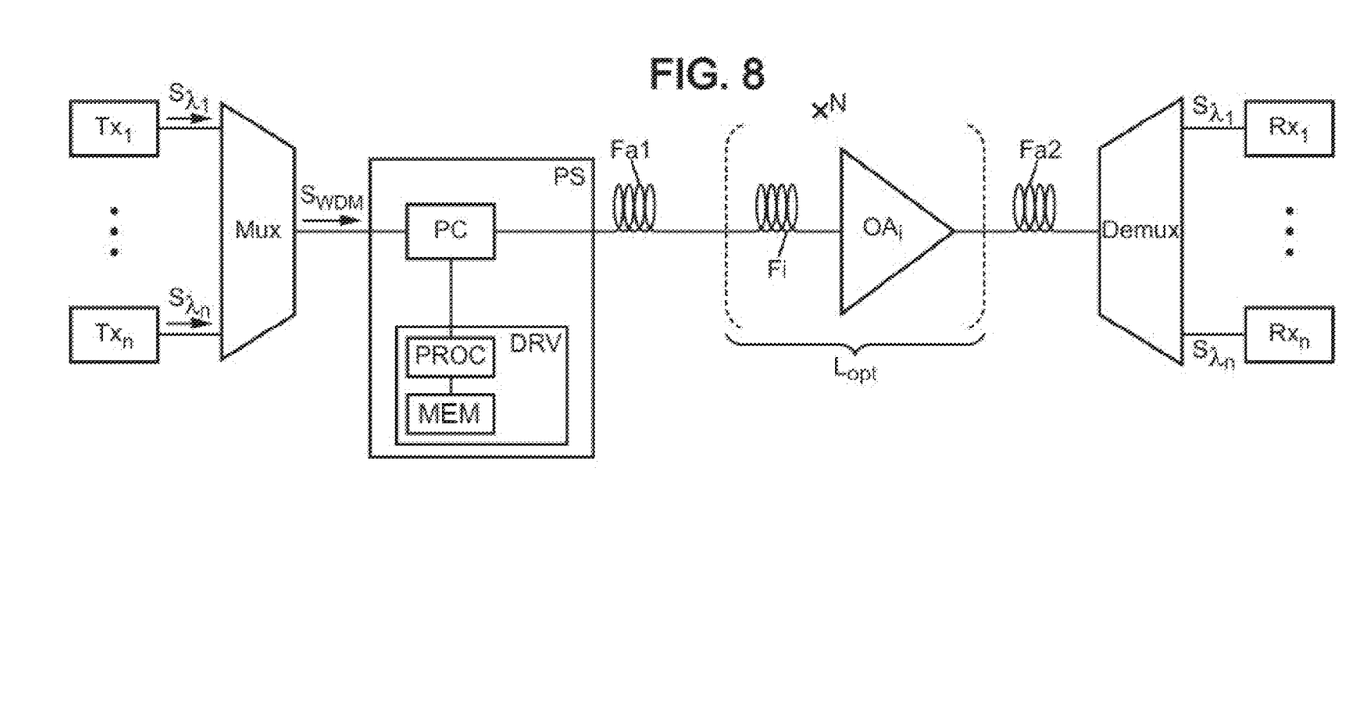
FIG. 8 schematically illustrates an optical transmission system comprising a polarization mode dispersion compensation device according to a particular embodiment of the invention.

We will now refer to FIG. 8 which illustrates a WDM transmission system comprising a compensation device PS according to the invention, such a compensation device PS making use of the compensation method as illustrated in FIG. 5 while using control parameters calculated according to the calculation method as illustrated in FIG. 3.

In this FIG. 8, a number n of optical transmitters $TX_1, \ldots, TX_n$ respectively transmit n optical signals $S_{\lambda 1}, \ldots, S_{\lambda n}$ that are respectively modulated on n distinct wavelengths $\lambda 1, \ldots, \lambda n$, said signals being multiplexed in a wavelength multiplexer Mux in order to provide a multichannel optical signal $S_{WDM}$ able to be transmitted on an optical link $L_{opt}$ comprising at least one optical fiber, or typically a succession of N optical segments composed of optical fibers $F_i$ and optical amplifiers $OA_i$ serving to maintain the power of the optical signal at a sufficient level as it travels through this optical link.

At the output from this optical link, a wavelength demultiplexer Demux demultiplexes the multichannel signal into n optical signals $S_{\lambda 1}, \ldots, S_{\lambda n}$ which can be individually received by each of the respective optical receivers $Rx_1, \ldots, Rx_n$.

The polarization compensation device PS of the invention comprises a polarization controller PC inserted at the output from the multiplexer Mux, before the input to the optical link $L_{opt}$, this polarization controller serving to scramble in a deterministic manner the state of polarization of the multichannel optical signal entering the optical link in the manner indicated above.

The polarization compensation device PS of the invention also comprises a module DRV for driving the polarization controller PC, able to send specific control parameters to the polarization controller PC, for example by means of a processing module PROC, comprising a processor for example, in order to drive and modify the state of polarization of the optical signal $S_{WDM}$ traveling through this polarization controller before it enters the optical link $L_{opt}$.

To do this, the control module DRV advantageously comprises storage means MEM in which is stored a plurality of control parameter values to be applied to the polarization controller, this plurality of control parameter values being obtained by means of the calculation method described above.

It is stressed here that FIG. 8 illustrates a WDM transmission system. No limitation is placed on the invention concerning this type of transmission, as the invention also applies to a single-channel transmission system comprising a compensation device PS of the invention.

As illustrated in FIGS. 1E-1F, the fact of having a certain level of residual chromatic dispersion results in a single penalty region being present on the Poincaré sphere, instead of the two opposing penalty regions when there is no residual chromatic dispersion.

Generally, the optical channels $\lambda_1, \ldots, \lambda_n$ transmitted in a WDM system present a non-zero residual chromatic dispersion at the end of the optical link. In certain cases, however, it is possible for this residual chromatic dispersion to be zero, which can result in the presence of two opposing penalty regions instead of a single one, thus increasing the risk of using states of polarization that fall within a region having a high bit error ratio.

In particular, this can be the case with recent WDM 10 Gbits/s links using fibers that compensate for chromatic dispersion (for example negative dispersion fibers) in order to compensate all channels of the link at the same time. In such WDM connections, a residual chromatic dispersion may remain in the channels at the end of the link, but it is then different in the various channels and may be insufficient to result in the formation of a single penalty region on the Poincaré sphere.

To avoid this situation, it is advantageous to guarantee a certain level of residual chromatic dispersion in the output from the optical link $L_{opt}$. To do this, the optical transmission system advantageously comprises at least one additional optical fiber of a length determined such that the level of residual chromatic dispersion in the output from the optical link $L_{opt}$ exceeds a predetermined threshold for the chromatic dispersion which can be on the order of 500 ps/nm, in order to guarantee that the penalty region is present in the form of a single spot on the Poincaré sphere but is also not overly large, to avoid causing an additional transmission penalty.

Such an additional fiber can be inserted before the optical link $L_{opt}$, as illustrated by the additional fiber Fa1, or after this optical link $L_{opt}$, as illustrated by the additional fiber Fa3. It is also possible to insert two additional fibers Fa1, Fa3 before and after the optical link $L_{opt}$ in order to obtain such a residual chromatic dispersion.

In addition, it may be advantageous to use optical transmitters $Tx_1, \ldots, Tx_n$ and an optical multiplexer Mux made with polarization-maintaining components, in order to have a multichannel signal $S_{WDM}$ having a fixed and known polarization at the input to the polarization controller PC for all wavelengths $\lambda_1, \ldots, \lambda_n$, which allows properly controlling the states of polarization at the output from this polarization controller PC.

The invention also relates to a computer program comprising code instructions for implementing the steps of the calculation method as illustrated in FIG. 3, when it is loaded and executed in a calculation module which may be in the form of a data processor or a computer.

The invention further relates to a computer program comprising code instructions for implementing the steps of the compensation method as illustrated in FIG. 7, in a polarization mode dispersion compensation device, particularly in the driver module DRV described in relation to FIG. 8 and which may be in the form of a data processor or a computer.

These computer programs can use any programming language, and may be in the form of source code, object code, or intermediate code between source code and object code, such as a partially compiled form, or in any other desired form.

The invention also relates to a medium for holding information that is readable by a computer or a data processor, and containing the instructions of a computer program as mentioned above. Such a medium can be any entity or device capable of storing the program. For example, the medium may consist of a storage medium such as ROM, for example a CD-ROM or a microelectronic circuit ROM, or a magnetic storage means such as a diskette or hard drive for example.

The information medium may be a transmissible medium such as an electrical or optical signal, which can be routed via an electrical or optical cable, by radio, or by other means. In particular, the program of the invention can be downloaded from an Internet type of network. Alternatively, the information medium may be an integrated circuit in which the program is embedded, the circuit being adapted to execute or to be used in the execution of the method in question.

Of course, the invention is not limited to the embodiments described above as an example, and can extend to other variants without leaving the scope of the invention.

It may thus be advantageous to use a "Super-FEC" code constructed on the basis of two codes concatenated according to the terminology arising from standard ITU-T G.975.1:
- an "internal" code which allows correcting individual errors and is able to reduce the size of the penalty region on the Poincaré sphere, and therefore to reduce the minimum distance D; and
- an "external" code, for example of the Reed-Solomon type, known for its capacity for correcting blocks of errors.

Such a combination of codes allows further reducing the probabilities of error in the transmission by combining the decrease in the penalty regions and the use of an error correction code to compensate for the blocks of errors typically caused by polarization mode dispersion.

Purely for illustration, an internal BCH type code (2047, 1952) can be used in combination with an external Reed-Solomon type code (1023, 1007).

However, other error correction codes, for example the ones described in the international standard UIT-T G.975.1, can be used in a WDB transmission system according to the invention. An example of such an error correction code is an LDPC (Low Density Parity Check) code that is 32640 bits long.

The invention is advantageous in that, although the positions of the penalty regions can be different for the various channels carried by the multichannel optical signal, the penalty regions have substantially the same form, due to the fact that the proper axes of polarization may be different for each wavelength, which allows the compensation solution of the invention to be applicable to a multichannel optical signal.

The invention is also advantageous in that it is independent of the data rate because it modifies only the polarization of the signals, which is a physical characteristic of the signal.

The invention is also advantageous in that it is independent of the modulation format used in the optical signal, except of course in the case of modulation formats which make use of polarization multiplexing.

Lastly, the invention does not require feedback signals which impose a delay between detecting degradation and applying the right parameters in the polarization mode dispersion compensation device.

The invention has applications in all networks equipped with optical fiber having a high level of polarization mode dispersion. A particularly interesting application concerns metropolitan area networks in which the cost of the solutions is a very important parameter.

The invention is particularly advantageous when the bit rates are between 10 Gbit/s and 40 Gbit/s, because the modulation formats used at these rates do not necessarily make use of polarization multiplexing.

However, at higher rates, i.e. on the order of 100 Gbit/s, although polarization multiplexing can be employed and other compensation solutions can be proposed such as consistent detection or OFDM format, it is also possible to use the solution presented in the present application.

The invention claimed is:

1. A method for determining a series of control voltage values to be applied to a polarization controller, arranged to compensate for the polarization mode dispersion affecting an optical signal traveling an optical link as a function of control voltage values, said method comprising:
    calculating a plurality of states of polarization for which the respective representations on a Poincaré sphere are separated from each other by a distance greater than a minimum distance dependent on an acceptable threshold for bit error ratios; and
    determining, for each calculated state of polarization, a control voltage value comprised in the series of control voltage values, according to at least one of the calculated states of polarization.

2. The calculation method according to claim 1, further comprising determining a number $n_{SOP}$ of distinct states of polarization to be calculated, and wherein the calculation of the plurality of states of polarization comprises calculating $n_{SOP}$ states of polarization having representations that are substantially equidistant on the Poincaré sphere.

3. The calculation method according to claim 2, wherein the $n_{SOP}$ distinct states of polarization are calculated such that their respective representations are distributed over the entire Poincaré sphere.

4. The calculation method according to claim 2, wherein the determination of the number $n_{SOP}$ of distinct states of polarization to be calculated includes calculating a maximum number $MAX(n_{SOP})$ of states of polarization as a function of the minimum distance, and selecting a number $n_{SOP}$ that is less than or equal to said maximum number $MAX(n_{SOP})$.

5. The calculation method according to claim 4, wherein the optical signal carries at least one frame of data and wherein an error correction code is used to encode the data carried by the optical signal, the method including determining the number $n_{SOP}$ of states of polarization to be calculated additionally comprising the calculation of a minimum number $MIN(n_{SOP})$ of states of polarization to be calculated as a function of the number $n_{bits}$ of bits in the frame and the correction capacity $Cap_{cod}$ of the error correction code, the number $n_{SOP}$ additionally being selected to be greater than or equal to said minimum number $MIN(n_{SOP})$.

6. The calculation method according to claim 5, wherein the error correction code used is constructed from at least the concatenation of a first internal code, suitable for reducing the minimum distance, and a second error correction code adapted for correcting blocks of errors.

7. A non-transitory computer-readable storage medium with an executable program stored thereon, wherein the program instructs a microprocessor to perform the steps of the calculation method according to claim 1, when it is loaded and executed in a calculation module.

8. A method of compensating for the polarization mode dispersion affecting an optical signal during its transmission in an optical link, the method comprising the successive application of a series of predetermined control voltage values to a polarization controller located upstream from the optical link, said predetermined control voltage values being calculated by means of the calculation method according to claim 1.

9. The compensation method according to claim 8, wherein the optical signal carries at least one frame of data, wherein the predetermined control voltage values being applied for an application duration are determined as a function of the number $n_{bits}$ of bits in the frame and the number $n_{SOP}$ of states of polarization.

10. A non-transitory computer-readable storage medium with an executable program stored thereon, wherein the program instructs a microprocessor to perform the steps of the compensation method according to claim 8, when it is loaded and executed in a polarization mode dispersion compensation device.

11. A polarization mode dispersion compensation device, comprising a polarization controller configured to receive an optical signal and a control module arranged to apply at least one control voltage value to the polarization controller, said compensation device being suitable for implementing the compensation method according to claim 8.

12. The compensation device according to claim 11, wherein the control module additionally comprises storage means in which is stored a plurality of control voltage values to be applied to the polarization controller, said plurality of control voltage values being obtained by means of the calculation method according to claim 1.

13. An optical transmission system comprising at least one optical link traveled by an optical signal and the compensation device according to claim 11, said compensation device being connected to the input to said optical link and being arranged to modify the state of polarization of the optical signal before it enters said optical link in order to compensate for the polarization mode dispersion affecting the optical signal as it travels said optical link.

14. The optical transmission system according to claim 13, further comprising at least one additional optical fiber of a length determined such that the level of residual chromatic dispersion at the output from the optical link exceeds a predetermined dispersion threshold.

15. The optical transmission system according to claim 13, further comprising a plurality of optical transmitters connected to an optical multiplexer in order to provide a multichannel optical signal to the compensation device, the plurality of optical transmitters and the optical multiplexer being realized with polarization-maintaining components.

\* \* \* \* \*